United States Patent [19]
Boyd

[11] Patent Number: 5,377,529
[45] Date of Patent: Jan. 3, 1995

[54] LEAK DETECTING DEVICE, AND METHOD OF CONSTRUCTING AND UTILIZING SAME

[76] Inventor: Mark A. Boyd, 2552 Middlebelt Rd., Flat Rock, Mich. 48134

[21] Appl. No.: 152,683

[22] Filed: Nov. 15, 1993

[51] Int. Cl.⁶ .................. G01M 3/00; G01M 3/28
[52] U.S. Cl. .................. 73/40; 73/40.5 R; 340/505; 340/606
[58] Field of Search .......... 73/40, 861.52, 40.5 R; 340/605, 606

[56] References Cited

U.S. PATENT DOCUMENTS

| | | | |
|---|---|---|---|
| 3,664,357 | 5/1972 | Kreiss | 137/2 |
| 4,308,746 | 1/1982 | Covington | 73/40.5 R |
| 4,355,654 | 10/1982 | Levesque et al. | 137/110 |
| 4,361,030 | 11/1982 | Heide | 73/40.5 R |
| 4,437,336 | 3/1984 | Abe | 73/40.5 R |
| 4,608,857 | 9/1986 | Mertens et al. | 73/40.5 R |
| 4,727,748 | 3/1988 | Horigome et al. | 73/40 |
| 4,735,231 | 4/1988 | Jacquet | 137/459 |
| 4,796,466 | 1/1989 | Farmer | 73/40.5 R |
| 4,835,717 | 5/1989 | Michel et al. | 364/558 |
| 4,916,437 | 4/1990 | Gazzaz | 340/632 |

*Primary Examiner*—Hezron E. Williams
*Assistant Examiner*—J. David Wiggins
*Attorney, Agent, or Firm*—Irving M. Weiner; Joseph P. Carrier; William F. Esser

[57] ABSTRACT

A system for monitoring fluid flow in a water supply for detection of leakage. The system includes sensing means for detecting fluid flow and generating a proportional pulse, timing and memory means for recording an occurrence of the pulses, means for determining if a substantially continuous series of pulses occurred over a time period, and means for indicating the results of the determination.

20 Claims, 1 Drawing Sheet

LEAK DETECTING DEVICE, AND METHOD OF CONSTRUCTING AND UTILIZING SAME

BACKGROUND OF THE INVENTION

1. Field of Invention

This invention relates to a device for monitoring fluid flow, and particularly to a device for detecting leakages within a water line of a building, responding thereto by indicating such detection and generating a signal to close the water line.

Leakage from water lines poses potentially severe problems to building owners. In many instances, a water leak goes undetected until significant damage to the building has occurred. The problem is intensified in mobile/modular homes because the plumbing therein is substantially made from polybutylene, which gradually deteriorates due to contact with fluids containing chlorine. As a result, a monitor is needed to immediately identify the occurrence of a leak of any size, to respond thereto by indicating to the building owner of such leakage, and to close the connection between the water supply and the building's plumbing.

2. Description of Related Art

There are known inventions that detect fluid leakages. For example, Abe U.S. Pat. No. 4,437,336 discloses a system for calculating an amount of fluid flow specifically occurring between two flow rates. The Abe system, however, fails to provide a monitor that detects the occurrence of a fluid leakage by simply observing the presence of a continuous flow of fluid, that provides for user programmability, or that disables any fluid flow upon such detection.

In addition, Gazzaz U.S. Pat. No. 4,916,437 discloses a gas monitoring system that senses a gas leak. However, the Gazzaz invention fails to provide a device that monitors the occurrence of a leakage over time or provides user programmability.

Further, Jacquet U.S. Pat. No. 4,735,231 discloses a device for sensing and stopping leakages in a pressurized line. The Jacquet invention, however, fails to provide a monitor that detects the occurrence of a fluid leakage by simply observing the presence of a continuous flow of fluid or provides for user programmability.

Still further, Mertens et al. U.S. Pat. No. 4,608,857 discloses a method of checking piping for fluid leaks by subjecting isolatable sections thereof to pressure means. The Mertens et al. invention, however, fails to provide a monitor that detects the occurrence of a fluid leakage by sensing fluid flow over time or provides user programmability.

SUMMARY OF THE INVENTION

The present invention overcomes the above-discussed limitations and shortcomings and thereby satisfies a significant need for a device that detects fluid leakages, is simple in construction and flexible in operation, and allows the building owner to be free from potential adverse effects of fluid leaks.

According to the present invention, there is provided a fluid leakage detection monitor comprising sensing means for detecting fluid flow and generating electrical pulses in proportion to the amount of flow; a first timing means for recording an occurrence of pulses from the sensing means; memory means for storing the occurrences; computing means to determine if a series of pulses occur substantially continuously over a time period, indicating a leakage; and means for indicating the detection thereof.

In a first preferred embodiment, the first timing means includes a counter which defines a first time period and a means for identifying whether a pulse from the sensing means was received therein. The presence of a pulse during the first time period is stored in memory. This sampling process then continues for a consecutive number of first time periods. If a pulse fails to occur in a given first time period, the data in memory is canceled and a new monitoring period begins. When a number of pulses occur in a consecutive number of first time periods over a predetermined second time period, the results from each first time period are used to determine that a substantially continuous series of pulses were received, indicating a continuous flow of fluid and therefore a leak.

In a second preferred embodiment, the first timing means includes a counter to determine the amount of time that elapses between consecutive pulses generated by the sensing means. If a series of pulses each occur within a predetermined first time period of its immediately preceding pulse throughout a second predetermined time period, then the results are used to determine that a substantially continuous series of pulses were received, indicating a continuous flow of fluid and therefore a leak.

The indicating means includes visual and audio indicators as well as the generation of a signal used to isolate the fluid supply line from the fluid distribution system so as to prevent further leakage therein.

Additionally, both the first and second time periods are adapted to be user programmable so the present invention can be adjusted to meet the user's detection requirements.

Although the present invention is adapted to run substantially continuously, it further includes a manual operational mode so as to provide a shortened time period in which to detect fluid leakage.

It is an object of the present invention to provide a monitor system that detects a substantially continuous fluid flow over a predetermined period of time.

Another object of the invention is to provide a fluid leakage monitor that allows the user thereof to set the level of fluid leakage desired to be detected.

It is an object of the present invention to provide a fluid leakage monitor system having a manual monitoring mode to provide for a shortened monitoring operation.

Other objects, advantages and salient features of the present invention will become apparent from the following detailed description, which, when taken in conjunction with the annexed drawings, discloses preferred embodiments of the present invention.

DETAILED DESCRIPTION OF THE PREFERRED EMBODIMENTS

Figure 2:
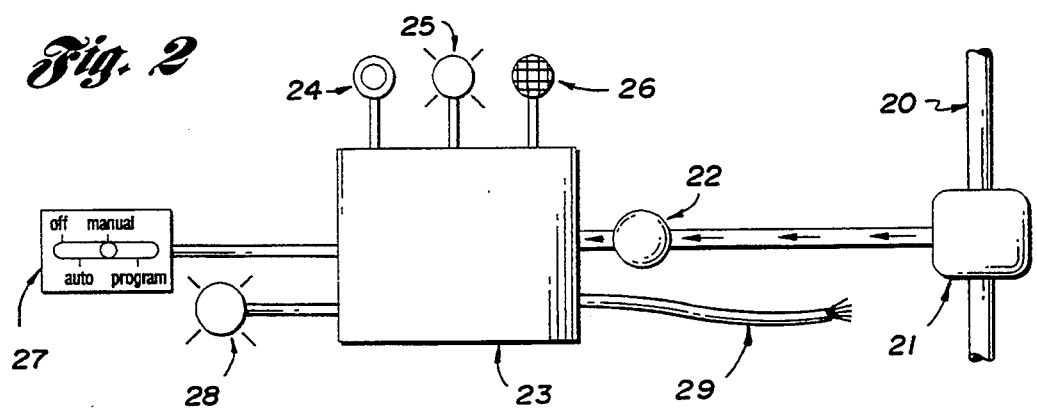
FIG. 2 is boxed diagram showing the components of the present invention.

Referring to FIG. 2, there is shown a fluid leakage monitor according to the present invention, including sensing means 21, pulse shaper 22, and microcontrol unit 23. Specifically, sensing means 21 detects fluid flow from fluid line 20. Pulses generated by sensing means 21 are received by pulse shaper 22, which in turn drives an input of microcontrol unit 23.

Figure 1:
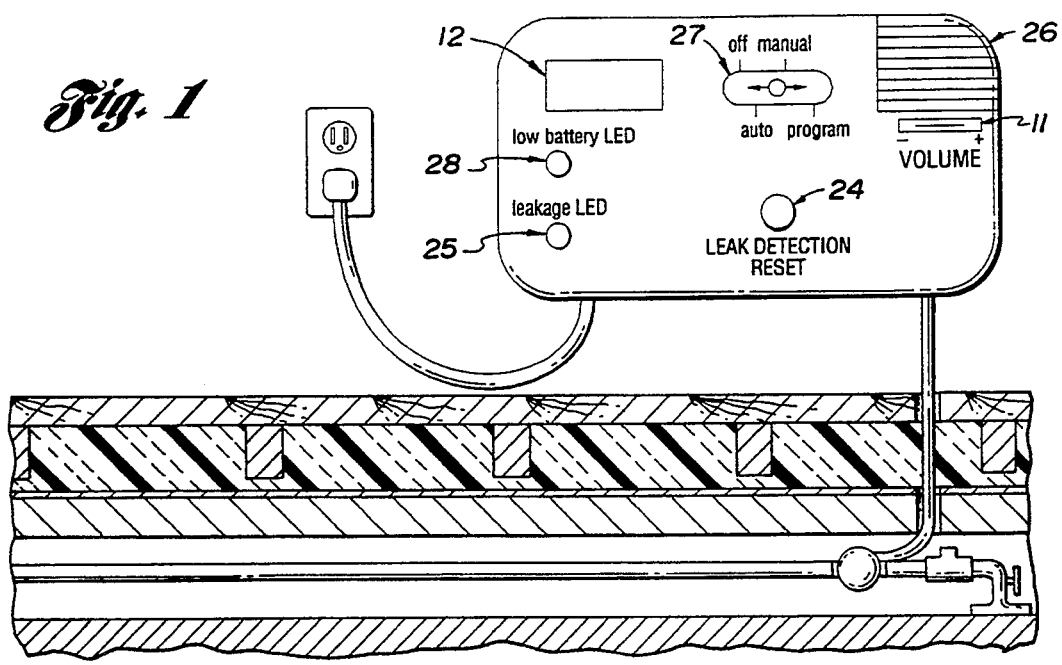
FIG. 1 is an exterior view of the of the present invention connected to a fluid supply line.

Although the monitor is powered by an AC source, preferably it includes a battery backup in order to provide for continual operation during a power failure. Alternatively, the monitor may be powered exclusively by a battery. In either instance, the monitor preferably includes low power LED indicator 28 and beeper speaker 26 to warn the user of inadequate battery supply levels, as shown in FIGS. 1 and 2.

According to the present invention, sensing means 21 generates pulses in proportion to the amount of fluid flowing through a section of piping, for example, water flowing in a water supply line. Sensing means 21 preferably, but not necessarily, includes a rotary encoder which senses the revolutions of a rotating device situated within the supply line. Such sensing means having extreme sensitivity to fluid flow, for example detecting flow of 1/1000 or 1/7200 gallon, are known in the industry.

Alternatively, sensing means 21 may include an optical sensor that attaches to an analog water meter normally found in the water supply line leading to a building. In such an arrangement, the optical sensor detects the movement of the hands or other moving members associated with analog water meters and generates pulses in proportion thereto.

Pulses generated by sensing means 21 in response to the sensing of a flow of fluid are preferably, but not necessarily, received by pulse shaper 22. Pulse shaper 22 is preferably, but not necessarily, used to buffer the pulse so as to provide a clean signal to microcontrol unit 23. Pulse shaper 22 may be necessary when sensing means 21 inadequately drives microcontrol unit 23, for example, when microcontrol unit 23 is situated at a significant distance from sensing means 21.

Preferably, pulse shaper 22 is connected to an interrupt input port of microcontrol unit 23 so no handshaking protocol is required to exist between pulse shaper 22 and microcontrol unit 23.

According to the present invention, microcontrol unit 23 includes a first timing means for recording occurrences of pulses from the sensing means; memory means for storing the occurrences; computing means to determine if a substantially continuous series of pulses occurs over a time period; and means for indicating the detection thereof.

In a first preferred embodiment, microcontrol unit 23 includes a first timing means for defining a first time period. The first timing means preferably but not necessarily comprises at least one counter or incrementer. The first timing means cooperates with input circuitry of microcontrol unit 23 to identify if a pulse from sensing means 21 (through pulse shaper 22) has been received during a first time period. If a pulse is received by microcontrol unit 23 from sensing means 21 during a first time period, such reception is recorded by storing it in microcontrol unit memory. If pulse shaper 22 is connected to an interrupt port of microcontrol unit 23, for example, the interrupt routine itself would comprise of storing a data value in memory. After a first time period has completed, another is started by the first timing means.

Microcontrol unit 23 further includes a second timing means for defining a second time period during which a fluid supply line is sufficiently monitored for determining whether leakages are located therein. Second timing means preferably also comprises a counter or incrementer. The second time period determines the number of consecutive first time periods that are included in each monitoring period.

In use according to the first embodiment, switch 27 is first set to the "auto" position to signify the start of the automatic mode. In this mode, the present invention is adapted to substantially continuously monitor for fluid leakages.

At the start of a monitoring period both the first and second timing means are initialized before both begin counting. If a pulse from sensing means 21 is received during a first time period, such reception is recorded in memory. In addition, the reception of the pulse may be recorded on liquid crystal display (LCD) 12 by substantially continuously updating the amount OF water flow corresponding thereto that has been detected during the monitor test period.

At the end of a first time period, a check is made of the data stored in memory. If the data shows that no pulse was received during that particular first time period, then both the first and second timing means are reinitialized, data in memory is canceled, and the monitoring period starts over. If, on the other hand, the data shows that a pulse was (or pulses were) received, then only the first timing means is reinitialized and the second timing means continues incrementing from the value it had previously reached. Thereafter, the next first time period commences.

If the end of the second time period is reached and data stored in memory shows that a pulse was received in each first time period throughout the entire second time period, then a continuous leak has been detected. As a result, beeper speaker 26 and LED 25 are activated so as to alert the user of a continuous leak, as shown in FIGS. 1 and 2. Volume control 11 is used to adjust the audible level of beeper speaker 26 so as to accommodate remote installation.

Figure 3:
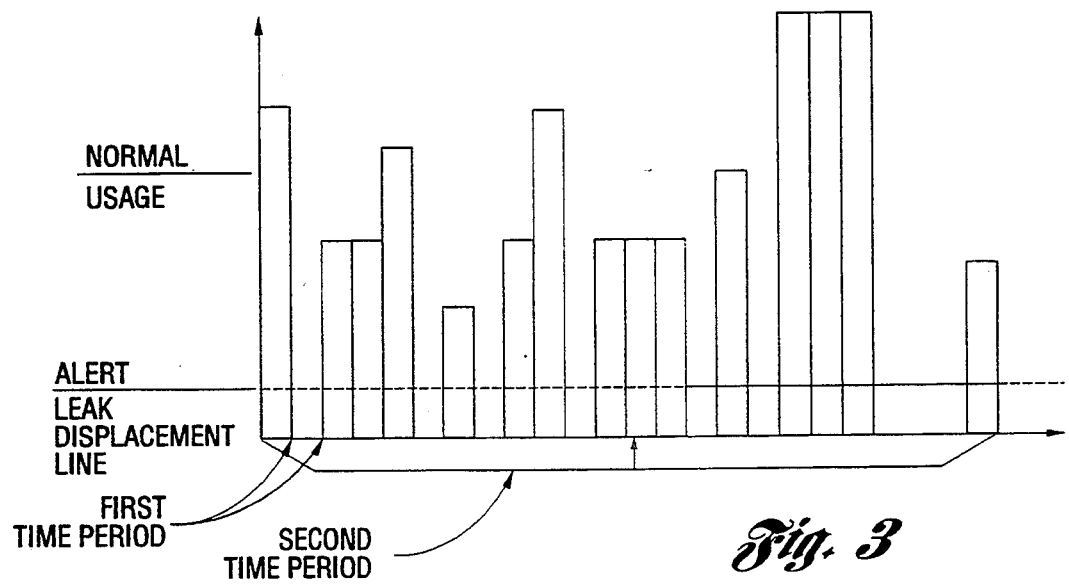
FIG. 3 is a time chart adapted to show the operation of the present invention.

A graphical representation of the operation of the first embodiment of the present invention is shown in FIG. 3 with time shown on the horizontal axis and fluid level shown on the vertical axis. As shown, each division of time equals one first time period and a consecutive series of first time periods comprises a second time period. The fluid level marked "alert leak displacement line" signifies the fluid flow necessary to create a pulse by sensing means 21.

Additionally, microcontrol unit 23 of the first embodiment of the present invention may generate a control signal to shut off the water supply in the event a leak is detected. For example, a control valve (not shown) may be inserted in the water line and controlled so as to prevent further leakage. This feature is especially significant in situations in which the user is unable to respond to the audio or visual indicators activated by microcontrol unit 23.

According to the first embodiment, the present invention further includes a manually-operated feature for testing for leaks in a shortened time period. By putting switch 27 in the "manual" position (FIGS. 1 and 2), microcontrol unit 23 executes a shortened leakage test preferably comprising a single first time period. In such a test, microcontrol unit 23 determines if a pulse is received from sensing means 21 in a first time period. If a pulse is received, LED 25 and beeper speaker 26 are activated to alert the user some water flow is detected. This manual test mode is especially helpful for users whom are unable to wait for the duration of the second time period for the results of the monitor operation. Alternatively, the manual test mode may include monitoring operation over a plurality of first time periods.

The first embodiment of the present invention further includes a manual reset capability. By activating reset switch 24 (FIGS. 1 and 2), the first and second timing means in microcontrol unit 23 are reinitialized and the data stored in memory is canceled. This is similar to the invention's response when an absence of pulses are detected in a first time period during the monitor operation. As a result of the activation of reset switch 24, the monitor test operation is restarted.

Microcontrol unit 23 preferably, but not necessarily, comprises a microcomputer. Alternatively, microcontrol unit 23 may comprise individual input/output logic, control logic, counter/incrementer logic, memory, and assorted glue logic. Preferably, microcontrol unit 23 is implemented on a single integrated circuit in order to reduce the size of the invention as well as manufacturing cost, but it instead may be implemented from a plurality of discrete components.

The first and second time periods generated by the first and second timing means, respectively, are preferably predetermined and set by program control or logic control at the time of manufacture. The first time period preferably, but not necessarily, is set to approximately five minutes. The second time period preferably, but not necessarily, is set to approximately two hours.

In addition, in order to provide a system for monitoring leakage levels that closely meet user requirements, both the first and second time periods may be programmable to values other than those set at the time of manufacturing. By entering values corresponding to both the time periods into microcontrol unit memory, such values are referred to throughout the monitoring period. This ability to alter the first and second time periods directly controls the level of fluid leakage that the present invention detects.

Accordingly, in order to provide such user programmability, additional input control is included in the first embodiment of the present invention. For example, mode switch 27 includes an additional setting to correspond to a program mode, as shown in FIG. 1. When in this setting, volume control 11 is configured to enter the value of the first and second time periods in minutes or seconds with the values entered displayed in LCD display 12. Once the values corresponding to the length of time for the first and second time periods are entered, the values are stored in microcontrol unit 23 memory for use in monitor operation.

The second preferred embodiment of the present invention utilizes many of the features of the first preferred embodiment, with the difference being in the manner in which a leakage is determined. According to the second embodiment, the first timing means includes a counter or incrementer and cooperates with the microcontrol unit input circuitry to determine the amount of time that elapses between consecutive pulses generated by sensing means 21.

In use according to the second embodiment of the present invention, switch 27 is set to the "auto" position as shown in FIG. 1. In this mode, the present invention is adapted to substantially continuously monitor for fluid leaks.

At the start of a monitoring period, both the first and second timing means are initialized. If a pulse is received by microcontrol unit 23 within a first time period of its immediately preceding pulse, such reception is recorded by storing it in microcontrol unit memory, and the first timing means is reinitialized and restarted.

If the pulse fails to occur within a first time period of its immediately preceding pulse, both the first timing means and second timing means are reinitialized and the monitoring period starts over again.

If a consecutive series of pulses are received, each of which occur within a first time period from its immediately preceding pulse so that a second time period has elapsed, then a substantially continuous leak has been detected. As a result, beeper speaker 26 and LED 25 are activated. In addition, a signal is generated to shut off a control valve located in the water line.

Although there have been described what are at present considered to be the preferred embodiments of the present invention, it will be understood that the invention can be embodied in other specific forms without departing from the spirit or essential characteristics thereof. The described embodiments are, therefore, to be considered in all aspects as illustrative, and not restrictive. The scope of the invention is indicated by the appended claims, rather than by the foregoing description.

I claim:

1. A fluid leakage detection system comprising:
   means for sensing flow of fluid and generating a pulse corresponding to an identification of a predetermined amount of said fluid flow;
   means, connected to said sensing means, for recording said pulse to a predetermined time period;
   means, connected to said recording means, for storing an occurrence of said recorded pulse;
   means, connected to said recording means and said storage means, for detecting whether a series of said recorded pulses occurred in each of a consecutive series of said time periods; and
   means for indicating said detection.

2. A fluid leakage detection system as recited in claim 1, wherein:
   said time periods have a programmable duration.

3. A fluid leakage detection system as recited in claim 1, wherein:
   said consecutive series of said time periods include a programmable number of said time periods.

4. A fluid leakage detection system as recited in claim 1, wherein:
   said detecting means includes means for generating a signal to inhibit said fluid flow upon said detection.

5. A fluid leakage detection system as recited in claim 1, wherein:
   said sensing means includes an optical sensor.

6. A fluid leakage detection system as recited in claim 1, further comprising:
   means for manually canceling said recorded pulses from said storage means and restarting said time period.

7. A fluid leakage detection system as recited in claim 1, further comprising:
   means for manually activating a determination of whether said generated pulse occurred in a said time period and indicating said occurrence.

8. A fluid leakage detection system as recited in claim 1, wherein:
   the system operates substantially continuously.

9. A fluid leakage detection system, comprising:

means for sensing flow of fluid and generating a pulse corresponding to an identification of a predetermined amount of fluid flow;

means, connected to said sensing means, for calculating a first time period between two consecutively generated pulses from said sensing means and comparing said first time period to a predetermined time duration;

means, connected to said calculating means, for determining whether, over a second time period, each of a consecutive series of said first time periods is less than said predetermined time duration; and means, connected to said determining means, for indicating a detection of said consecutive series of said first time periods each being less than said predetermined time duration.

10. A fluid leakage detection system as recited in claim 9, wherein:

said determining means includes means for storing said comparison.

11. A fluid leakage detection system as recited in claim 9, wherein:

said indicating means includes means for generating a signal to shut off said fluid flow upon said detection.

12. A fluid leakage detection system as recited in claim 9, wherein:

said predetermined time duration is programmable.

13. A fluid leakage detection system as recited in claim 9, wherein:

said second time period is of programmable duration.

14. A fluid leakage detection system as recited in claim 10, further comprising:

means for manually restarting said second time period and canceling said stored comparison.

15. A fluid leakage detection system as recited in claim 9, wherein:

said sensing means includes an optical sensor.

16. A fluid leakage detection system as recited in claim 9, further comprising:

power supply means having a battery backup.

17. A fluid monitoring system for detecting leakage of fluid, comprising:

a sensor that monitors fluid flow and generates a pulse corresponding to an identification of a predetermined amount of fluid flow; and a microcontrol unit having input circuitry to receive said pulses, a plurality of counters adapted to increment substantially continuously and to initialize upon an absence of said pulse in a time period, memory to store data pertaining to said reception of said pulse, and circuitry to determine if a consecutive sequence of said stored data indicates continuous fluid flow and to generate a signal to shut off a fluid flow valve depending on said determination.

18. A fluid monitoring system as recited in claim 17, wherein:

said counters include a first counter to define said time period and a second counter to define said sequence of said stored data; and said first counter additionally initializes upon reaching said time period.

19. A fluid monitoring system as recited in claim 18, wherein:

said first counter additionally initializes upon said reception of said pulse.

20. A fluid monitoring system as recited in claim 17, wherein:

said time period is programmable; and
said sequence is programmable.

* * * * *